United States Patent Office 3,465,009
Patented Sept. 2, 1969

3,465,009
NOVEL INTERMEDIATES IN THE PREPARATION OF 13 - POLYCARBONALKYL - 17α - HYDROXY-18,19 - DINORPREGN - 4 - EN - 3,20 - DIONES AND ACYLATES THEREOF
Daniel M. Teller, King of Prussia, George H. Douglas, Paoli, and Herchel Smith, Wayne, Pa., assignors to American Home Products Corporation, New York, N.Y., a corporation of Delaware
No Drawing. Filed Oct. 13, 1967, Ser. No. 675,027
Int. Cl. C07c 169/36; A61k 17/06
U.S. Cl. 260—397.4                                     5 Claims

ABSTRACT OF THE DISCLOSURE

The present invention is concerned with dl-3-alkoxy-13-polycarbonalkyl-18,19-dinorpregna - 3,5 - dien-20-ones and dl-3-alkoxy-17α-hydroperoxy-13-polycarbonalkyl - 18,19-dinorpregna-3,5-dien-20-ones which are useful intermediates in the synthesis of dl-17-hydroxy-13-polycarbonalkyl-18,19-dinorpregn-4-ene-3,20-dione, acylates which are pharmacologically useful progestational agents.

The present invention relates to new and novel steroids which are useful intermediates. In particular, the compounds of the present invention are useful intermediates in the preparation of dl-17-hydroxy-13-polycarbonalkyl-18,19-dinorpregn-4-ene-3,20-dione, acylates which are pharmacologically efficacious as progestational agents.

The new and novel steroidal compounds within the purview of the present invention are exemplified by the following structural formula:

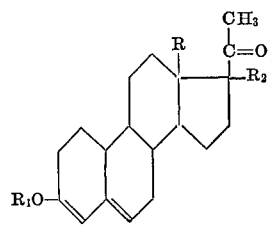

wherein R is polycarbonalkyl; $R_1$ is lower alkyl; and $R_2$ is selected from the group consisting of hydrogen and alpha hydroperoxy. As employed herein the term "lower alkyl" is defined to include both branched and straight chain alkyl moieties containing from about one to about eight carbon atoms. Alternatively, by the term "polycarbon alkyl" is meant an alkyl moiety having from two to about eight carbon atoms. Typical examples of these compounds are:

dl-13-ethyl-3-methoxy-18,19-dinorpregna-3,5-dien-20-one;
dl-13-ethyl-17α-hydroperoxy - 3 - methoxy-18,19-dinorpregna-3,5-dien-20-one;
dl-3-ethoxy-13-ethyl-18,19-dinorpregna-3,5-dien-20 - one; and
dl-3-ethoxy-13-ethyl-17α-hydroperoxy-18,19-dinorpregna-3,5-dien-20-one.

The preparation of the steroid intermediate compounds of the present invention and their utilization in the synthesis of known progestational agents is schematically depicted by the following reaction sequence:

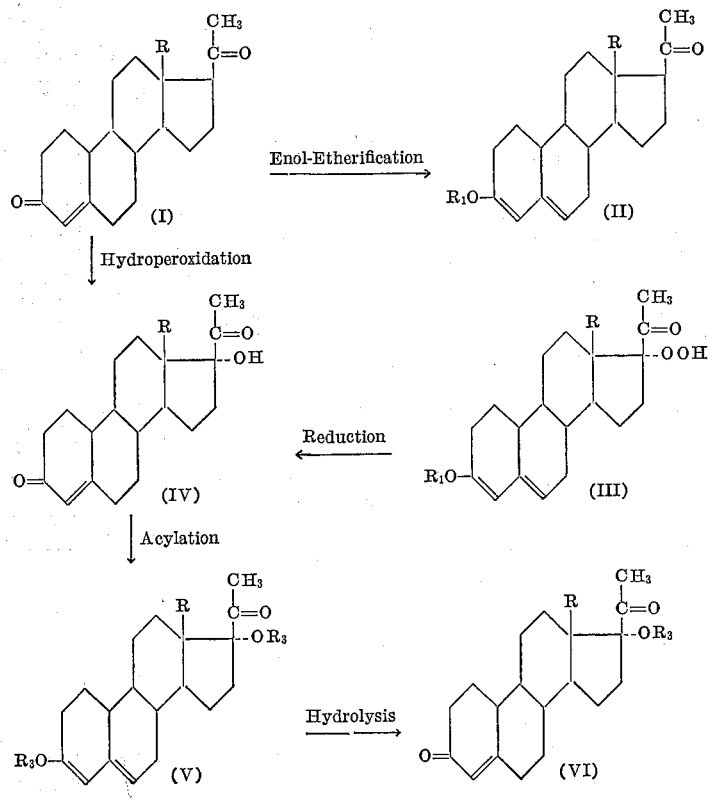

wherein R and $R_1$ are defined as above and $R_3$ is defined as hydrogen or acyl.

The above enol-etherification reaction is conducted by refluxing an appropriate dl-13-polycarbonalkyl-18,19-dinorpregn-4-ene-3,20-dione (I) in an appropriate solvent, e.g., a dimethoxypropane, dimethylformamide, methanol and p-toluene-sulfonic acid mixture for a period from about one to about six hours.

When the enol-etherification reaction is complete, the resulting dl-3-alkoxy-13-polycarbonalkyl - 18,19 - dinorpregna-3,5-dien-20-one (II) is separated by routine recovery procedures, e.g., admixing the reaction mixture with alkaline ice water, extracting with a water-immiscible solvent, e.g. benzene, washing and evaporating the combined extracts and then crystallizing the product (II) by trituration with ether.

The hydroperoxidation reaction is effected by adding a tetrahydrofuran solution of the above prepared dl-3-alkoxy-13-polycarbonalkyl-18,19 - dinorpregna-3,5-dien-20-one (II) to a solution of an alkali metal in a tertiary alkanol at a temperature below 10° C. and stirring the mixture in an oxygen atmosphere until oxygen uptake is complete. Preferably this reaction is conducted using potassium metal in t-butanol for a period of about two hours.

When the hydroperoxidation reaction is complete, the resulting dl-3-alkoxy-17α-hydroperoxy-13-polycarbonalkyl-18,19-dinorpregna-3,5-dien-20-one (III) is obtained by conventional recovery procedures. For example, the reaction mixture is neutralized with an acid, e.g., acetic acid, extracted with a water-immiscible solvent, e.g., ethyl acetate, then the combined extracts are washed, dried and concentrated at temperatures below 40° C. to afford the product (III).

The reduction reaction is conducted by contacting the above prepared dl-3-alkoxy-17α-hydroperoxy-13-polycarbonalkyl - 18,19 - dinorpregna-3,5-dien-20-one (III) with zinc dust in glacial acetic acid for a period of about six to about twenty-four hours.

When the reduction reaction is complete, the resulting dl - 17α - hydroxy - 13 - polycarbonalkyl - 18,19 - dinorpregn-4-ene-3,20-dione (IV) is separated by standard chemical procedures. For example, the reaction mixture is filtered, admixed with a water-immiscible solvent, then the combined extracts are washed with water, an alkaline solution, water and concentrated. Thereafter, the product (IV) may be recrystallized from a suitable solvent, e.g., an ethyl acetate-liquid alkane mixture, ether or dioxane.

The acylation reaction is effected by contacting the above prepared dl-17α-hydroxy-13-polycarbonalkyl-18,19-dinorpregn-4-ene-3,20-dione (IV) with an acyl halide, its corresponding acyl anhydride and pyridine at about room temperature for a period of more than twenty-four hours.

When acylation reaction is complete, the resulting dl-3,17-dihydroxy-13 - polycarbonalkyl - 18,19 - dinorpregna-3,5-dien-20-one, diacylate (V) is obtained using customary isolation procedures. For example, the reaction mixture is concentrated at a temperature below 45° C., the residue is admixed with water, extracted with a water-immiscible solvent, the combined extracts are washed with water, an alkaline solution, water, then dried and concentrated.

The hydrolysis reaction is conducted by contacting the above prepared dl-3,17-dihydroxy-13-polycarbonalkyl-18,19-dinorpregna-3,5-dien - 20 - one, diacylate (V) with an alkanolic solution of an alkali metal hydroxide at temperatures below 10° C. under an inert atmosphere for a period from about ten minutes to about four hours. Preferably, this reaction is conducted utilizing methanolic potassium hydroxide under a nitrogen atmosphere.

When the above hydrolysis is complete, the resulting dl - 17 - hydroxy - 13 - polycarbonalkyl-18,19-dinorpregn-4-ene-3,20-dione, acylate (VI) is separated by routine recovery procedures. For example, the reaction mixture is poured into an aqueous alkaline solution, extracted with a water-immiscible solvent, then the organic layer is washed with an aqueous alkaline solution, water, dried and concentrated.

The starting materials in the above process, the dl-13-polycarbonalkyl-18,19-dinorpregn-4 - ene - 3,20 - diones (I) are prepared by the procedure described in copending U.S. patent application, Ser. No. 228,384, entitled "Steroid Synthesis," filed Oct. 4, 1962, which is a continuation-in-part of Ser. No. 57,904, filed on Sept. 23, 1960 and now abandoned; Ser. No. 91,341 filed on Feb. 24, 1961 and now abandoned; Ser. No. 137,535, filed Sept. 12, 1961 and now abandoned; Ser. No. 195,000, filed May 15, 1962, and now abandoned; and Ser. No. 196,557, filed May 16, 1962 and now abandoned.

The steroid intermediate compounds (III) and (IV) of the present invention are useful in the preparation of dl - 17 - hydroxy - 13 - polycarbonalkyl-18,19-dinorpregn-4-ene-3,20-dione acylates (VI) which are described in copending U.S. patent application, Ser. No. 628,275, entitled "Synthesis of Steroids," filed on Apr. 4, 1967, wherein it is disclosed that these compounds (VI) are physiologically active substances.

These compounds (VI) in standard pharmacological tests have demonstrated oral activity as progestational agents which are useful in the treatment of functional uterine bleeding, amenorrhea, premenstrual tension, dysmenorrhea, habitual absortion, menopausal, syndrome and infertility.

When these dl-17-hydroxy-13-polycarbonalkyl-18,19-dinorpregn-4-ene-3,20-dione acylates (VI) are employed as progestational agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may also be administered orally in the form of solutions which may contain coloring and flavoring agents or they may be injected parenterally. For parenteral administration they may be used in the form of a sterile solution containing other solutes, for example, enough saline or glucose to make the solution isotonic.

The dosage of these dl-17-hydroxy-13-polycarbonalkyl-18,19-dinorpregn-4 - ene - 3,20 - dione, acylates (VI) will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 0.005 mg. to about 0.3 mg. per kilo per day, although as aforementioned variations will occur. However, a dosage level that is in the range of from about 0.01 mg. to about 0.1 mg. per kilo per day is most desirably employed in order to achieve effective results.

The following examples are given by way of illustration and are not to be construed as limitations of this invention, many variations of which are possible without departing from the scope and spirit thereof.

Example I

A solution of dl-13-ethyl-18,19-dinorpregn-4-ene-3,20-dione (0.20 g.), 2,2-dimethoxypropane (2.0 ml.), N,N-dimethylformamide (2.0 ml.), methanol (0.10 ml.) and p-toluenesulfonic acid (6 mg.) is refluxed for three and a half hours. The solution is cooled, excess solid sodium bicarbonate is added and the mixture poured into ice water. Extraction with benzene, washing the extracts with water and stripping in vacuo yields a gum which crystallizes on trituration with ether. Recrystallization from methanol containing a trace of pyridine affords 75 mg. of dl-13-ethyl-3-methoxy-18,19-dinorpregna-3,5-dien-20-one; M.P. 112–121° C.;

$\lambda_{max.}^{KBr}$ 5.86, 6.07, 6.16, 8.54$\mu$; $\lambda_{max.}^{EtOH}$ 236 m$\mu$ ($\epsilon$ 16,600), 250 m$\mu$ ($\epsilon$ 16,500)

Similarly, dl-13-ethyl-18,19-dinorpregn-4-ene-3,20-dione is converted to dl-3-ethoxy-13-ethyl-18,19-dinorpregna-3,5-dien-20-one.

Example II

A solution of dl-13-propyl-18,19-dinorpregn-4-ene-3,20-dione (0.40 g.), 2,2-dimethoxypropane (4.0 ml.), N,N-dimethylformamide (4.0 ml.), methanol (0.20 ml.) and p-toluenesulfonic acid (1.2 mg.) is refluxed for five hours. The solution is cooled, excess solid potassium bicarbonate is added and the mixture poured into ice water. Extraction with toluene, washing the extracts with water and stripping in vacuo yields a gum which crystallizes on trituration with ether. Recrystallization from ethanol affords dl-3-methoxy-13-propyl-18,19-dinorpregna-3,5-dien-20-one.

In the same manner, the following compounds are prepared:

dl-3-ethoxy-13-propyl-18,19-dinorpregna-3,5-dien-20-one;
dl-13-butyl-3-methoxy-18,19,dinorpregna-3,5-dien-20-one;
dl-3-ethoxy-13-hexyl-18,19,dinorpregna-3,5-dien-20-one; and
dl-3-butoxy-13-ethyl-18,19-dinorpregna-3,5-dien-20-one.

Example III

To a solution of potassium metal (1.7 g.) in distilled t-butanol (45 ml.), there is added dl-13-ethyl-3-methoxy-18,19-dinorpregna-3,5-dien-20-one (1.50 g.) in tetrahydrofuran (15 ml.) at 0° C. The solution is stirred vigorously at 0° C. in an atmosphere of oxygen. After two hours oxygen uptake ceases, at which time 60 percent of the theoretical is absorbed. The solution is neutralized to pH 7 with 1 N acetic acid, ethyl acetate is added and the solution washed with water and dried over anhydrous sodium sulfate. Evaporation at temperatures below 40° C. in vacuo affords 1.3 g. of crystalline dl-13-ethyl-17$\alpha$-hydroperoxy-3-methoxy-18,19-dinorpregna-3,5-dien-20-one;

$\lambda_{max.}^{KBr}$ 3.02, 5.85 (shoulder), 5.90, 6.04, 6.14, 8.56$\mu$

In like manner, dl-3-ethoxy-13-ethyl-18,19-dinorpregna-3,5-dien-20-one is hydroperoxidized to afford dl-3-ethoxy-13-ethyl-17$\alpha$-hydroperoxy-18,19-dinorpregna-3,5-dien-20-one.

Example IV

To a solution of sodium metal (2.4 g.) in distilled t-butanol (90 ml.), there is added dl-3-methoxy-13-propyl-18,19-dinorpregna-3,5-dien-20-one (3.0 g.) in tetrahydrofuran (30 ml.) at temperatures below 10° C. The solution is stirred vigorously below 10° C. in an atmosphere of oxygen. After about two hours oxygen uptake ceases. The solution is then neutralized to pH 7 with 1 N acetic acid, ethyl acetate is added and the solution washed with water and dried over anhydrous sodium sulfate. Evaporation at less than 40° C. in vacuo affords dl-17$\alpha$-hydroperoxy-3-methoxy-13-propyl-18,19-dinorpregna-3,5-dien-20-one.

In like manner, the other compounds of Example II are hydroperoxidized to yield:

dl-3-ethoxy-17$\alpha$-hydroperoxy-13-propyl-18,19-dinorpregna-3,5-dien-20-one;
dl-13-butyl-17$\alpha$-hydroperoxy-3-methoxy-18,19-dinorpregna-3,5-dien-20-one;
dl-3-ethoxy-17$\alpha$-hydroperoxy-13-hexyl-18-19-dinorpregna-3,5-dien-20-one; and
dl-3-butoxy-13-ethyl-17$\alpha$-hydroperoxy-18,19-dinorpregna-3,5-dien-20-one.

Example V

The crude dl-13-ethyl-17$\alpha$-hydroperoxy-3-methoxy-18,19-dinorpregna-3,5-dien-20-one (1.3 g.) from Example III is stirred for fourteen hours at room temperature in glacial acetic acid (41.5 ml.) containing zinc dust (2.5 g.). The mixture is filtered through Celite, diluted with benzene and the solution washed with water, saturated aqueous sodium bicarbonate, water and stripped in vacuo giving 0.78 g. of product. Two recrystallizations from ethyl acetate/hexane affords 0.20 g. of dl-13-ethyl-17$\alpha$-hydroxy-18,19-dinorpregn-4-ene-3,20-dione, M.P. 208–211° C.;

$\lambda_{max.}^{KBr}$ 3.02, 5.86, 6.04, 6.19$\mu$; $\lambda_{max.}^{EtOH}$ 240 m$\mu$ ($\epsilon$ 16,900)

Analysis.—Calculated for $C_{21}H_{30}O_3$: C, 76.32; H, 9.15. Found: C, 76.61; H, 9.22.

In the same way, dl-3-ethoxy-13-ethyl-17$\alpha$-hydroperoxy-18,19-dinorpregna-3,5-dien-20-one is converted to dl-13-ethyl-17$\alpha$-hydroxy-18,19-dinorpregn-4-ene-3,20-dione.

Example VI

The crude dl-17$\alpha$-hydroperoxy-3-methoxy-13-propyl-18,19-dinorpregna-3,5-dien-20-one (2.6 g.) from Example IV is stirred for twenty hours at room temperature in glacial acetic acid (83 ml.) containing zinc dust (5.0 g.). The mixture is filtered through Celite, diluted with toluene and the solution washed with water, saturated aqueous sodium bicarbonate, water and stripped in vacuo yielding dl-17$\alpha$-hydroxy-13-propyl-18,19-dinorpregn-4-ene-3,20-dione.

Repeating the above procedure with the other compounds of Example IV, the following are prepared:

dl-13-butyl-17$\alpha$-hydroxy-18,19-dinorpregn-4-ene-3,20-dione; and
dl-13-hexyl-17$\alpha$-hydroxy-18,19-dinorpregn-4-ene-3,20-dione.

Example VII

To a mixture of dl-13-ethyl-17$\alpha$-hydroxy-18,19-dinorpregn-4-ene-3,20-dione (1.20 g.) in acetyl chloride (9.6 ml.) there is added with vigorous stirring, acetic anhydride (19.2 ml.) and then pyridine (0.96 ml.). The mixture is warmed to effect solution, then stirred at room temperature for sixty-seven hours. Then the solvents are stripped off in vacuo (<45° C.) giving a solid residue. The residue is dissolved in ether, washed with water, saturated aqueous sodium bicarbonate, water dried over anhydrous sodium sulfate and stripped in vacuo giving 1.45 g. of dl-13-ethyl-3,17-dihydroxy-18,19-dinorpregna-3,5-dien-20-one, diacetate; M.P. 152–170° C.;

$\lambda_{max.}^{KBr}$ 5.68, 5.77, 5.84$\mu$

Similarly, dl-13-ethyl-17$\alpha$-hydroxy-18,19-dinorpregn-4-ene-3,20-dione is reacted with propionyl chloride and propionyl anhydride to afford dl-13-ethyl-3,17-dihydroxy-18,19-dinorpregna-3,5-dien-20-one, dipropionate.

Example VIII

To a mixture of dl-17$\alpha$-hydroxy-13-propyl-18,19-dinorpregn-4-ene-3,20-dione (2.40 g.) in butyryl chloride (19.2 ml.), there is added with vigorous stirring, butyryl anhydride (38.4 ml.) and then pyridine (1.9 ml.). The mixture is warmed to effect solution, then stirred at room temperature for twenty-four hours. The solvents are stripped off in vacuo (<45° C.) giving a solid residue. The residue is dissolved in ether, washed with water, saturated aqueous sodium bicarbonate, water dried over anhydrous sodium sulfate and stripped in vacuo to afford dl-3,17-dihydroxy-13-propyl-18,19-dinorpregna-3,5-dien-20-one, dibutyrate.

Repeating the above reaction to react the other compounds of Example VI with appropriate acylhalides and anhydrides the following compounds are obtained:

dl-13-butyl-3,17-dihydroxy-18,19-dinorpregna-3,5-dien-20-one, dibenzoate; and
dl-13-hexyl-3,17-dihydroxy-18,19-dinorpregna-3,5-dien-20-one, diacetate.

Example IX

The crude dl-13-ethyl-3,17-dihydroxy-18,19-dinorpregna-3,5-dien-20-one, diacetate (1.45 g.) from Example VII is placed in a mixture of tetrahydrofuran (24 ml.), methanol (24 ml.) and methanolic potassium hydroxide (2 percent, 24 ml.) at 0° C. The mixture is stirred under nitrogen at 0° C. for forty-five minutes, poured into saturated aqueous sodium bicarbonate, extracted with ether, the organic layer washed with saturated aqueous sodium bicarbonate, water, dried over anhydrous sodium sulfate and stripped in vacuo. The residue crystallizes on trituration with ether. Column chromatography on Grade III Woelm neutral alumina (50 g.) with hexane/benzene (1:1) and recrystallization from ethyl acetate/hexane affords 0.51 g. of dl-13-ethyl-17-hydroxy-18,19-dinorpregn-4-ene-3,20-dione, acetate; M.P. 194–196° C.; $\lambda_{max.}^{KBr}$ 5.78, 5.83, 6.00, 6.20, 7.97$\mu$ and no hydroxyl absorption; $\lambda_{max.}^{EtOH}$ 240 m$\mu$ ($\epsilon$ 16,900)

Analysis.—Calcd. for $C_{23}H_{32}O_4$: C, 74.16; H, 8.66. Found: C. 74.29; H, 8.39.

In like manner, dl-13-ethyl-3,17-dihydroxy-18,19-dinorpregna-3,5-dien-20-one, dipropionate is converted to dl-13-ethyl-17-hydroxy-18,19-dinorpregn-4-ene-3,20-dione, propionate.

Example X

The crude dl-13,17-dihydroxy-13-propyl-18,19-dinorpregna-3-5-dien-20-one, dibutyrate (2.9 g.) from Example VIII is placed in a mixture of tetrahydrofuran (50 ml.), methanol (25 ml.) and methanolic sodium hydroxide (2 percent, 50 ml.) below 10° C. The mixture is stirred under nitrogen at 0° C. for four hours, poured into saturated aqueous sodium bicarbonate, extracted with ether, the organic layer washed with saturated aqueous sodium bicarbonate, water, dried over anhydrous sodium sulfate and stripped in vacuo. The residue crystallizes on trituration with ether to afford dl-17-hydroxy-13-propyl-18,19-dinorpregn-4-ene-3,20-dione, butyrate.

When the above hydrolysis is repeated on the other compounds of Example VIII, the following products are obtained:

dl-13-butyl-17-hydroxy-18,19-dinorpregn-4-ene-3,20-dione, benzoate; and
dl-13-hexyl-171-hydroxy-18,19-dinorpregn-4-ene-3,20-dione, acetate.

What is claimed is:
1. A compound selected from the group consisting of those having the formula:

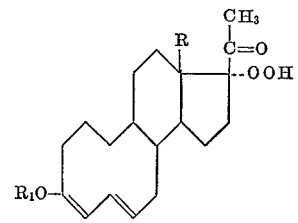

wherein R is polyacrobonalkyl and $R_1$ is lower alkyl.

2. A compound as described in claim 1 which is: dl-13-ethyl-17α-hydroperoxy-3-methoxy-18,19-dinorpregna-3,5-dien-20-one.

3. A compound as described in claim 1 which is dl-3-ethoxy-13-ethyl-17α-hydroperoxy-18,19-dinorpregna-3,5-dien-20-one.

4. A compound as described in claim 1 in which is: dl-17α-hydroperoxy-3-methoxy-13-propyl-18,19-dinorpregna-3,5-diene-20-one.

5. A compound as described in claim 1 which is: dl-3-ethoxy-17α-hydroperoxy-13-propyl-18,19-dinorpregna-3,5-dien-20-one.

References Cited
UNITED STATES PATENTS
3,178,412   4/1965   Ringold _____ 260—239.55

OTHER REFERENCES
Chemical Abstracts, vol. 62 (1965), 1722 g.

HENRY A. FRENCH, Primary Examiner

U.S. Cl. X.R.
260—999

PO-1050
(5/69)

UNITED STATES PATENT OFFICE
CERTIFICATE OF CORRECTION

Patent No. 3,465,009      Dated September 2, 1969

Inventor(s) Daniel M. Teller, George H. Douglas and Herchel Smith

It is certified that error appears in the above-identified patent and that said Letters Patent are hereby corrected as shown below:

In column 2, formulae,

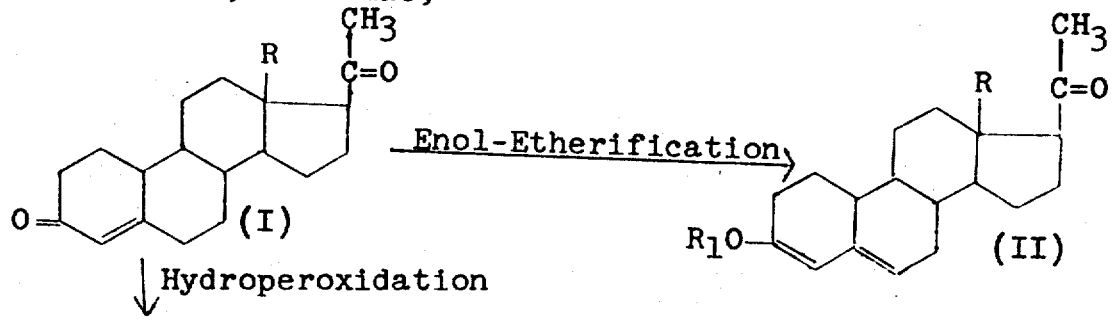

should read

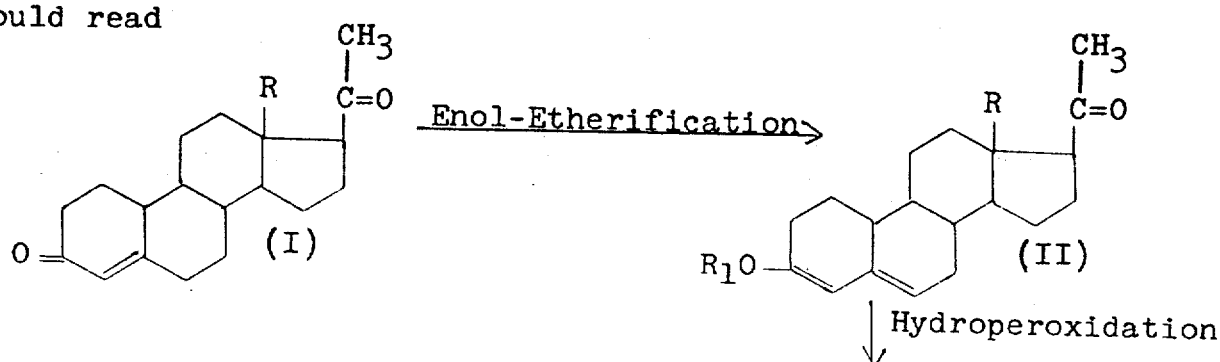

In column 8, formula,

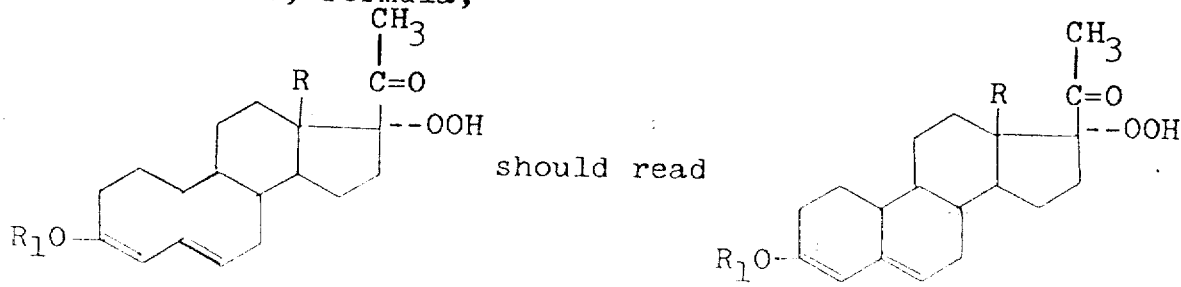

In column 8, claim 1, line 20, "polyacrobonalkyl" should read --polycarbonalkyl--

Signed and sealed this 5th day of May 1970.

(SEAL)
Attest:

_____ M. FLETCHER
Attesting Officer             Commissioner of Patents